Aug. 17, 1943.　　　D. E. WOBBE　　　2,326,815
METHOD OF MAKING CAN BODIES
Filed Nov. 28, 1939　　　2 Sheets-Sheet 1
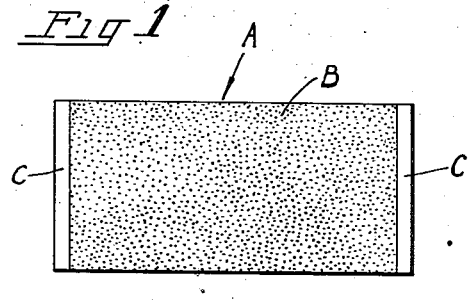
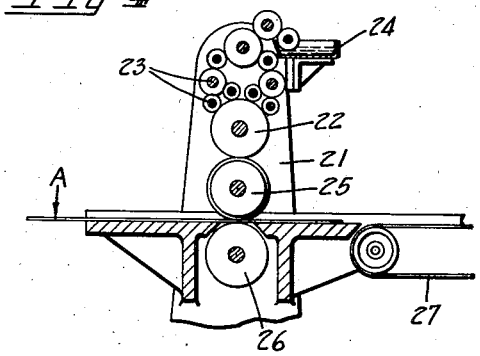
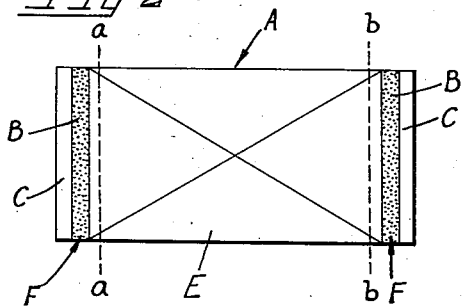
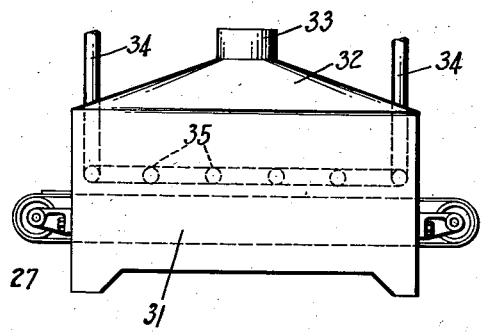
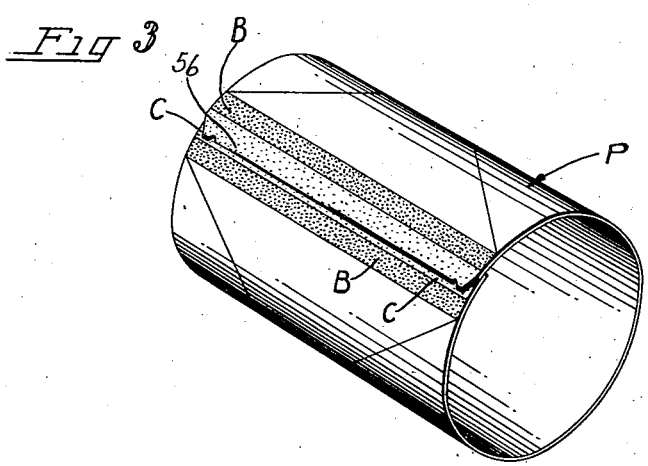

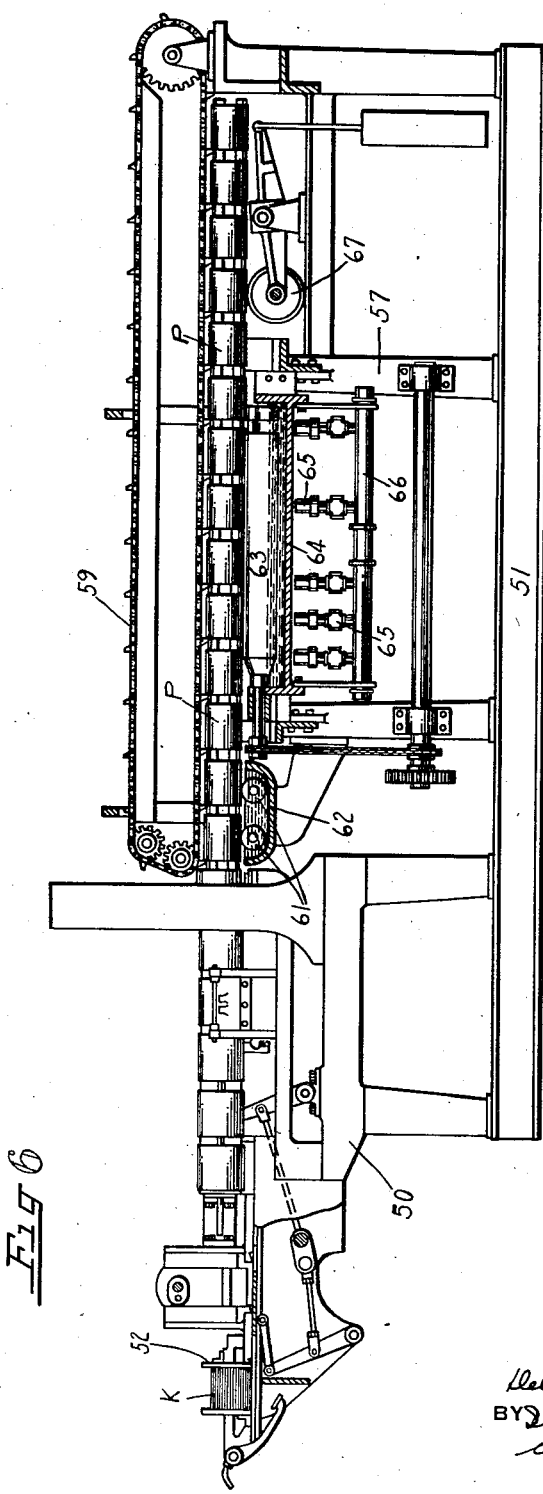

UNITED STATES PATENT OFFICE 2,326,815

METHOD OF MAKING CAN BODIES

Delbert E. Wobbe, River Forest, Ill., assignor to American Can Company, New York, N. Y., a corporation of New Jersey Application November 28, 1939, Serial No. 306,575

3 Claims. (Cl. 113—120)

The present invention relates to the treatment of sheet material such as black plate, tinplate and other metallic sheet materials and has particular reference to a method of can manufacture which includes coating parts of the surface of a sheet with a heat resistant and solder repellent substance and then making soldered side seam can bodies therefrom.

Tinplate or other sheet materials which goes into the manufacture of cans is first cut or severed to form blanks and the blanks are shaped into tubular form, edges of the blank being joined in a side seam to produce the tubular can body. Such a side seam may be formed by overlapping the edges of the blank or may be in whole or in part interlocked with formed or hooked edges. After such a side seam is provided, where the can being manufactured is to be hermetically sealed, the can body with its side seam is conveyed through a soldering operation and molten solder is applied to the exterior of the can body so that the interhooked or overlapped parts of the seam are fused together by the solder.

It has always been a considerable problem to provide just enough solder to accomplish the bonding without an excess of solder and the attention of the can manufacturer has been particularly directed to retaining what is known as a narrow "solder cut," this expression indicating the width of the solder which appears on the outside wall of the can body at the side seam after soldering.

Of recent years lithographed cans have been made in greater quantities and the lithographing is usually done while the sheet material from which the can body is made, is in flat sheet form. The inks or paints used in the usual lithographing operation are of a nature which will not withstand excessively high heats without scorching. Since molten solder is applied to the exterior surface of the can body for the soldering step and since this is excessively high heat, it has been the usual custom to leave a plain strip of the metallic surface exposed in that region of the side seam, so that the edge of the lithographing will not be subjected directly to the molten solder. This is satisfactory for protecting the lithographed surface but it has the disadvantage of producing an unsightly bare strip along the side seam which is readily apparent from observation of the can and which detracts from the lithographed label designating the contents.

The present invention is particularly directed to improving this side seam soldering condition and contemplates the use of a heat resisting substance to cover up such a bare surface on the exterior wall of the can so that the edges of this substance can be extended beyond the edge of the lithographing and can be brought into juxtaposition with the side seam.

This heat resisting substance, which is preferably a metallic paint, not only covers up the heretofore bare or uncoated strip between the side seam and the edge of the lithographing but furthermore is solder resisting and may be employed to reduce the soldering area or solder cut on the exterior of the can so that its edges are defined accurately by the edges of the heat resisting substance. In other words, a very narrow solder cut may be obtained and not only is solder saved but the appearance of the can is greatly improved.

An object of the invention is the provision of a method of treating sheet material for subsequent soldering by the application of a heat resisting and solder repellent material applied as a coating on a surface of the sheet so that the sheet may be formed into a can body and the side seam of the body soldered while accurately confining such a side seam to a minimum width.

Another object of the invention is the provision of a method of the character described wherein a metallic paint is placed in proper position on a sheet material which is to be subsequently formed into a can body, the edge of such coating providing a defining line for molten solder during a subsequent soldering operation.

Yet another object is the provision of a method of treatment of a lithographed can body in a manner which will insure a protecting strip of heat resisting and solder repellent material on the side seam of the can body, which protecting material extends beyond the edges of the lithographed surface of the can body and defines a narrow solder cut.

Numerous other objects and advantages of the invention will be apparent as it is better understood from the following description, which, taken in connection with the accompanying drawings, discloses a preferred embodiment thereof.

Referring to the drawings:

Fig. 1 is a plan view of a can body blank embodying the present invention and showing the coating of certain areas of the blank with a heat resisting and solder repelling substance and showing parts of the sheet uncoated;

Fig. 2 is a similar view showing the surface of the blank further treated as by superimposing a lithographed label over the coated sections so that the latter extends beyond the edges of the lithographing;

Fig. 3 is a perspective view of a formed can body having a side seam, such a body being produced as from the blank of Fig. 2, and shown on a larger scale;

Fig. 4 is a schematic sectional elevation of some of the parts of a coating machine or lithographic press for exemplifying coating and also lithographing steps of the present invention;

Fig. 5 is a schematic side elevation of a drying oven shown for the purpose of exemplifying the step of drying a coated or lithographed surface; and Fig. 6 is a schematic view in side elevation of a typical can body maker and side seam soldering machine.

The drawings illustrate various steps in the manufacture of sheet material to provide cans and show the steps applied to a can body blank so that there is finally provided a can body having a side seam. Some of the views show the article during different stages of manufacture while other views show apparatus for carrying out certain steps in the method.

The drawings necessarily are somewhat schematic and reference should first be had to Fig. 1 which discloses a can body blank A. The first step in the treatment according to the present invention is coating parts of one surface of the blank with a heat-resistant and solder-repellent substance. Such a coated area is indicated by the letter B.

It will be understood that a can body blank is shown in this connection instead of a larger sheet from which a number of can bodies are usually made in order to simplify the description. Commercially, this first coating step will be made on a sheet containing a plurality of can bodies unless the can body is very large and the sheet will then be severed to provide for the individual body. The size of the can being used determines the number of blanks or can body spaces embodied in a sheet and since the present invention is not concerned with size, simplicity or description dictates showing a sheet containing space for only one can body or in other words, a can body blank A is shown.

This heat-resistant and solder repellent surface B is disposed on the sheet (in this embodiment on the blank) in a manner to leave uncoated opposed side strips C. This uncoated part of the surface is for the side seam area which will subsequently receive the solder after the can body has been formed.

In Fig. 4 there is disclosed the principal parts of a coating machine which may be used for applying the coated surface B to the blank A of Fig. 1. Such a machine comprises broadly a frame 21 having an applying or coating roller 22 which may be supplied with proper heat resisting and solder repelling paint or other substance by a series of fountain rollers 23 operating in conjunction with a paint or ink supply trough 24.

The roller 22 applies the paint to the surface of a printing roller 25. The printing roller 25 may be cut away in places to provide for the particular design desired. For a single can body blank A of Fig. 1 this cut away portion of the roller will constitute two relieved marginal edges so that the grooved out or relieved spaces correspond with the desired uncoated sections C of the sheet or blank A. The numeral 26 designates a backing-up or feed roller located below the printing roller for propelling the sheet A through the printing operation. The printed sheet may be properly discharged from the machine upon a conveyor belt 27.

The coating B which is applied to the surface of the sheet A is preferably a metallic paint which will withstand heat scorching or burning. There are several forms of metallic paint which may be used for this purpose, an aluminum paint being suggested as exemplary of this type of coating. While the blank A of Fig. 1 is shown as being fully coated with the coating B excepting for the marginal uncoated strips C, in some cases this coating B will not extend over such a large area.

When applied as shown in Fig. 1 this coated surface B provides not only for accurately defining the width of the spaces C but also provides a prime coating for the exterior surface of the can which will be made from the blank. In some cases this coating will be the final coating for the can. Again the coating B may not be used as a prime coat but will take the form of strips located adjacent to the marginal edges of the blank. For example such strips may extend only a short distance inside of the uncoated margins C as along the dotted lines a—a and b—b in Fig. 2. In such a form the edges of the coating will merely provide boundary lines for the uncoated marginal blank edges C.

The conveyor belt 27 of Fig. 4 may lead directly through a drying oven shown schematically in Fig. 5. Such an oven comprises a casing 31 enclosing a chamber through which the conveyor passes. A hood 32 constitutes the top of the oven and a vent pipe 33 extending up from the top provides for drawing off the fumes and gases of the drying coating as well as products of combustion of the heating elements. Heater pipes 34 may be used as gas supply pipes in which may be arranged suitable burners 35 located in the oven so that the heating flames may provide the desired drying heat on the coated surface of the sheet or blank as it passes beneath.

Fig. 2 illustrates a second step in the printing or coating of the sheet A. For this step a coating or lithographing machine such as is disclosed in Fig. 4 may be used and at this time a lithographed label or pattern E may be superimposed upon the dried printed part or parts B of the sheet A. When applied over the larger area, shown in Fig. 1, this lithographed label constitutes a second coat having the coated surface B as a prime coat.

In the event that such a prime coat is not desired and where the heat resisting and solder repelling strips are used on the surface as previously suggested in connection with the edge lines a—a and b—b (Fig. 2), the lithographed label E will be applied to the surface of the blank so that a large part of such coated strips will project beyond and be exposed outside of the edges of the lithographed label.

After printing such a label design the sheet or blank may be subjected to a drying step as by passing it through a suitable drying oven, such as that disclosed in Fig. 5. The lithographed label pattern will be a regular can design such as is desired for the particular disposition of the can which finally will be made from the blank and such a design usually carries a plurality of colors. The usual lithographing or printing methods, therefore, will be used for the purpose of obtaining the desired color scheme.

Usually such lithographed or printed labels are not heat resistant and will not stand the heat of molten solder (such as will be used when the side seam of a can is soldered). By leaving the marginal edges of the heat resisting metallic paint exposed, as indicated by the letter F (Fig. 2), protection against burning or scorching of the lithographed label will be had since the marginal coated areas F which extend beyond the label and adjacent the uncoated side seam margin C will constitute the part coming in contact with the molten solder during the soldering operation.

The blank is now ready to be made into a can body. The operations of forming the blank, notching where notching is desired, edging or bending the edges if the side seam is to be interlocked, and bumping such interlocked edges closely together, will be carried out in the usual manner and in a conventional form of body making machine so extensively used in can manufacture. The soldering of the side seam after its final bumping will be carried out in a conventional side seam soldering machine.

Fig. 6 illustrates one such usual form of body maker and is designated broadly by the numeral 50. Such a machine may be mounted on a base 51. In this machine the coated and lithographed blanks K are fed from a magazine 52 and are thereupon subjected to the various body making operations. A tubular can body P (Fig. 3) results. Such a body is here shown as having a soldered combination lapped and interlocked side seam 56 which is a form widely used in can manufacture.

To solder such a side seam 56, the fully formed can body is preferably fed directly into a side seam soldering machine, designated generally by the numeral 57, in Fig. 6. Such a machine may be mounted upon the same base 51 on which the body maker 50 is mounted. The formed can body is conveyed through the side seam soldering machine by a conveyor 59 and during such passage is first passed over a roller 61 of a flux applying device 62 which constitutes a part of the side seam soldering machine. Acid flux is thus applied to the side seam.

The can body with the fluxed seam is next moved through a soldering operation during which time it passes over a solder applying roller 63 rotatably mounted within a solder bath 64. The solder within the bath is maintained in a molten condition by suitable heating elements 65. These elements are herein shown as gas burners connected to a gas supply pipe 66. After application of the molten solder on the exterior of the body, the side seam is then wiped in the usual manner, a wiping device 67 being illustrated for this purpose.

Since these can bodies must be formed and soldered at high speeds it is essential that each operation is carried on while the can body blank or the formed can body is moving through the apparatus. It is unavoidable that the solder applying roller 63, which carries the solder up to the side seam 56 of the tubular body P, places an excess of solder on the surface at the side seam and the wiping device 67 thereupon removes such excess solder. This wiping device is usually a disc wiping roller formed of fabric and must necessarily be wide enough to cover the entire soldered area of the side seam.

In the usual soldering operation, therefore, the excess of solder which is applied to the side seam and which is later wiped off by the relatively wide wiping roller, necessitates a solder cut or width of exposed solder area to which the solder is applied which is greatly in excess of what is needed for holding the side seam parts together. Not only is this solder area unnecessary but it presents a side stripe along the side of the can which detracts from its appearance. The wider the solder cut the more disturbing is this surface between the spaced edges of the lithographed label adjacent the side seam.

By reason of the use of a heat resisting and solder repelling coated surface B and the utilization of the marginal edges F of the surface which extends beyond the edges of the label as embodied in the present invention, this wide solder cut is greatly reduced. Since the solder does not adhere to the marginal coated areas F, the edge of such an area will be used as a boundary line for the solder cut. Accordingly not only is less solder deposited upon the can body in the same soldering apparatus and using the same type of soldering roller but also a sharply defined solder cut is produced.

Cutting down on the width of solder exposed at the side seam makes it possible to more fully cover the surface of the can body with the lithographed label E so long as the molten solder does not strike the label. Therefore, the barrier lines set up against the solder by the marginal coated parts F may be spaced closer together and a better appearance had for the can.

It is thought that the invention and many of its attendant advantages will be understood from the foregoing description, and it will be apparent that various changes may be made in the steps of the process described and their order of accomplishment without departing from the spirit and scope of the invention or sacrificing all of its material advantages, the process hereinbefore described being merely a preferred embodiment thereof.

1. A method of preparing sheet can body blanks and forming into can bodies for the manufacture of cans having soldered side seams, which comprises coating one surface of said blank intermediate its opposite edges with a heat resistant and solder repellent metallic paint while leaving as uncoated bare metal a narrow strip at each opposed edge which together constitute the side seam area, superimposing a label design on said surface with its edges spaced inwardly from said uncoated side seam area and also leaving two sections of the heat resistant coating extending as marginal strips adjacent the side seam area, forming said coated blank into a tubular can body having the bare uncoated metal of said side seam area substantially incorporated into the side seam and having the coated and labelled surface on the outside of said tubular body extending to adjacent said seam and spaced therefrom, and applying molten solder to the side seam from the outside so that said heat resistant and solder repellent marginal coating confines the solder of the seam to the narrow space between the edges of the said coating, said marginal coating protecting the said label design from the heat of the molten solder and imparting to said tubular body a narrow solder cut with sharply defined edges.

2. A method of manufacturing can bodies having soldered side seams, which comprises coating intermediate portions of a surface of a metal can body blank with a heat resistant and solder repellent aluminum paint so that opposite edge portions of the blank which constitute the side seam area are left as bare uncoated metal and remain as narrow margins of the blank, lithographing a label design on said coated surface so that the heat resistant coating extends beyond the opposite edges of the lithographed design, forming said blank into a can body so that the uncoated portion of the blank at the side seam area is incorporated in the side seam and the coated portion is exposed on the outside of the can body adjacent the seam as a narrow side seam margin, and applying molten solder to the side seam and to the exposed uncoated margin, whereby said heat resistant and solder repellent marginal coating confines the solder on the exterior of the seam to the narrow marginal space between the edges of the said coating, said marginal coating thus protecting the said label design from the hot solder while giving a narrow solder cut with sharply defined edges.

3. A method of making sheet metal can bodies having soldered side seams which will effect a substantial saving of solder, which method comprises coating a predetermined portion of the surface of a sheet metal blank with a heat resistant and solder repellent aluminum paint while leaving straight edged portions of said surface uncoated to provide a can body blank having an effective solderable marginal seam area of restricted minimum width, forming a tubular can body from said blank with said coated surface portion on the outside and said solderable marginal area incorporated in a side seam with the edges of said coated portion located on opposite sides of said restricted solderable area, said coated portion defining a narrow solderable band with straight edges, applying molten solder to said band and completely covering said band with molten solder up to the edges of said coated portion, said edges functioning as solder barriers and remaining substantially unaffected by the heat of said molten solder, and wiping the entire area between said solder barriers to remove excess solder.

DELBERT E. WOBBE.